June 8, 1954

W. J. CASEY III 2,680,498

DISK BRAKE

Filed Dec. 7, 1950

INVENTOR.
William J. Casey, III.
BY
Orrin O. B. Garner
Atty.

June 8, 1954     W. J. CASEY III     2,680,498
DISK BRAKE

Filed Dec. 7, 1950     2 Sheets-Sheet 2

INVENTOR.
William J. Casey, III
BY
*Orrin O. B. Garner*
Atty.

Patented June 8, 1954

2,680,498

UNITED STATES PATENT OFFICE 2,680,498

DISK BRAKE

William J. Casey III, Chicago, Ill., assignor to American Steel Foundries, Chicago, Ill., a corporation of New Jersey Application December 7, 1950, Serial No. 199,610

14 Claims. (Cl. 188—59)

This invention relates to railway brake equipment.

The principal object of the invention is to devise an equalizer supported brake arrangement wherein a novel torque connection between the brake frame and the truck frame is provided which accommodates relative movements between the same without disturbing the position of the brake frame. Such an arrangement affords an extremely desirable advantage in that the entire brake is carried by the unsprung portions of the truck so that the parts of the brake are maintained in precise cooperative relationship with each other and the excessive stresses which are incident to designs wherein a portion of the brake structure is carried by the sprung parts of the truck, are entirely eliminated.

A more specific object of the invention is to provide guides on the truck frame which cooperate with the brake frame carried by the equalizers to resist torque forces imposed on the brake frame during braking application.

A further object of the invention is to eliminate the usual torque arm extending between the brake frame and the wheel and axle assembly.

A further object of the invention is to arrange the torque connection between the brake frame and the truck frame in such a manner that a tipping effect due to braking torque on the truck frame is eliminated.

A further object of the invention is to provide torque absorption means integral with the sprung member of the railway truck so as to cushion said means from the excessive road shocks normally incident to railway operation.

These and other objects of the invention will become more apparent from the specification and the drawings, wherein.

Figure 1:
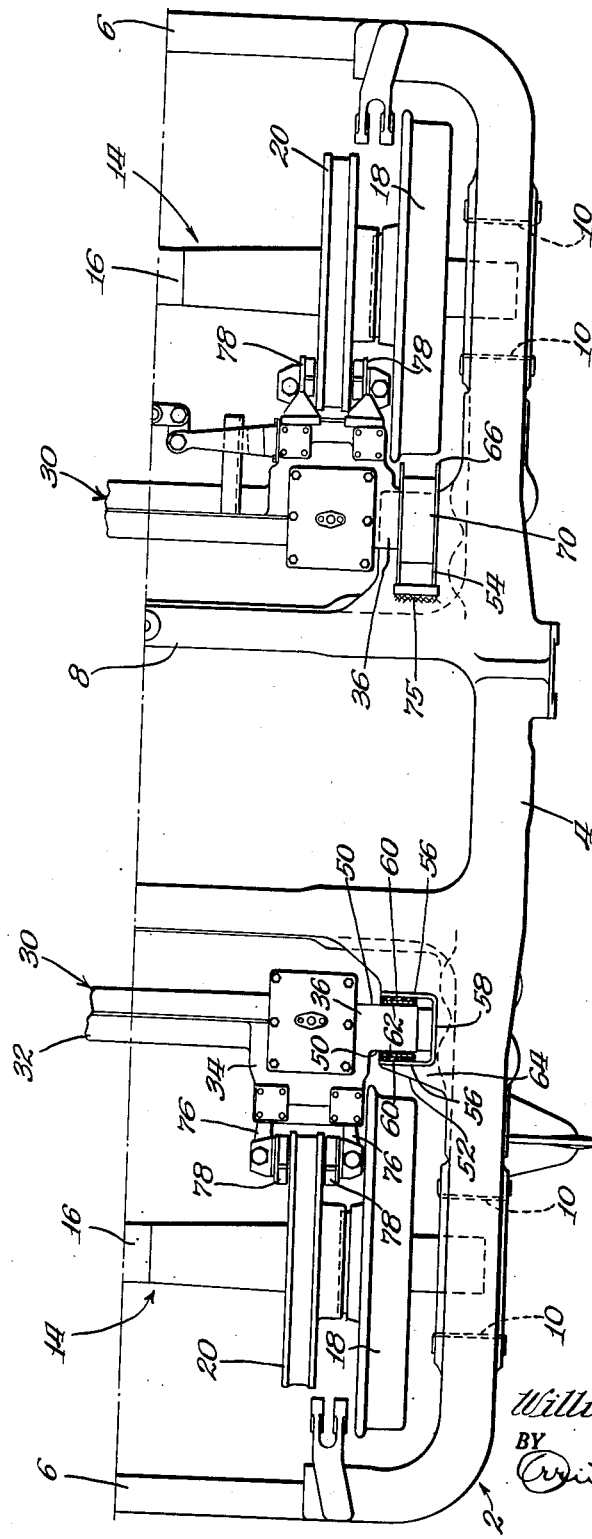
Figure 1 is a top plan view, partly in section, of one half of a railway car truck with the invention applied thereto, the truck being identical at the opposite sides of the longitudinal vertical center plane.

Describing the invention in detail, the invention is shown applied to a four wheel railway car trucks, comprising a frame, generally designated 2, and including a side rail 4 at each side thereof, and end rails 6, 6 interconnecting the ends of the side rails and spaced transoms 8, 8 interconnecting intermediate portions of the side rails, the transoms affording support and connection for an associated bolster (not shown) therebetween in the usual manner as will be understood by those skilled in the art. The truck frame comprises a pair of spaced pedestals 10, 10 at each end of each side rail 4. Each pair of pedestals receives a journal box 12 therebetween (shown in phantom lines at the right of Figure 2), the journal boxes affording convenient connections for the truck frame to wheel and axle assemblies 14, 14 in conventional manner.

Figure 2:
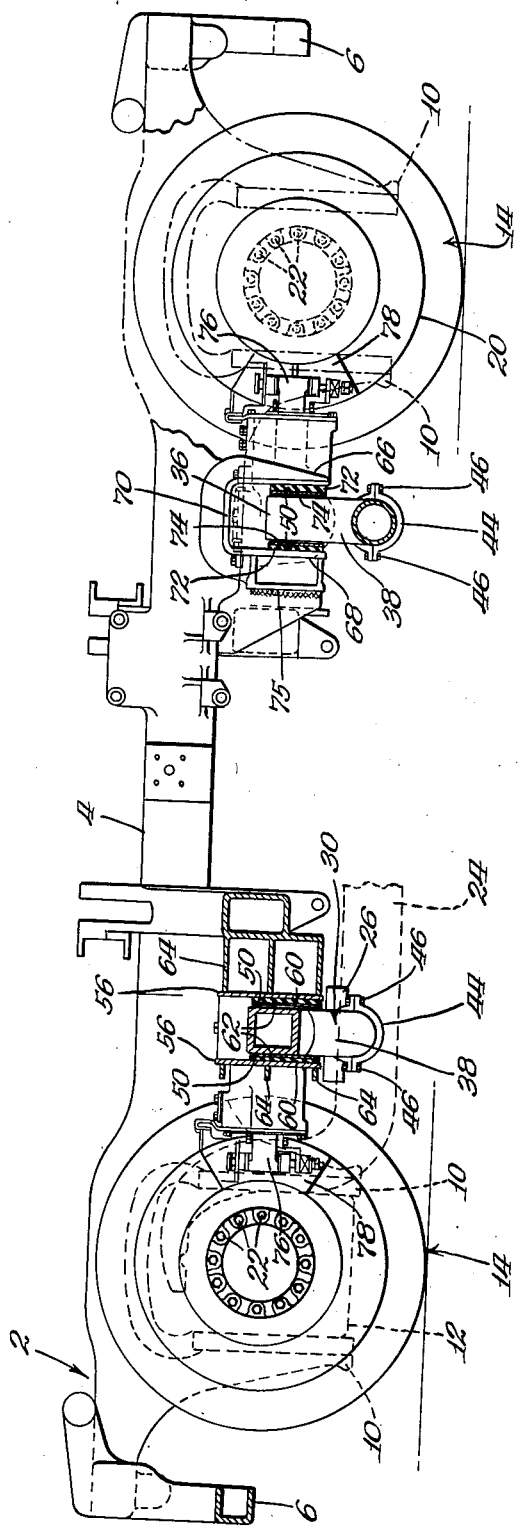
Figure 2 is a side elevational view of Figure 1, partly in section.

Each wheel and axle assembly comprises an axle 16 with a wheel 18 thereon adjacent each end thereof and each wheel is connected on its inner side to a brake rotor 20 as by bolts 22, 22 (Figure 2).

An equalizer 24 is positioned at each side of the truck below the side rails thereof and each equalizer is supported at opposite ends on the journal boxes 12, 12 at opposite ends of the truck as is well known in the art. Each equalizer carries adjacent each end thereof a spring seat 26 on which are positioned springs 28 arranged in conventional supporting relationship to the truck frame 2.

Figure 3:
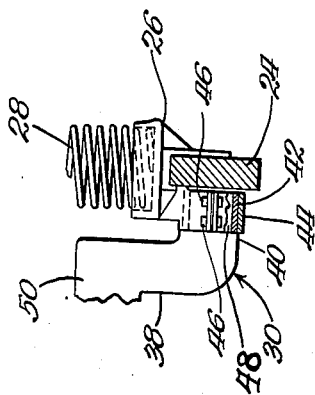
Figure 3 is a fragmentary side elevational view of one end of the brake frame, with its connection to the equalizer spring seat partly broken away, the equalizer being shown in transverse vertical section.

The equalizers 24 at opposite sides of the truck carry brake frames 30, 30 disposed adjacent respective wheel and axle assemblies 14. Each brake frame 30 comprises a preferably hollow beam 32 extending transversely of the truck, the beam being formed adjacent each rotor with a conventional cylinder housing 34. The outboard side of each housing is formed preferably integral with an extension 36 of substantially quadrilateral form. Each extension 36 has a downwardly extending leg portion 38 which has its lower end preferably terminating at the level of the adjacent equalizer 24, as best seen in Figure 3, the portion 38 being continued as a horizontally extending portion 40 in the form of a cylindrical or tubular member extending into a resilient, preferably rubber, bushing 42 fitted within a clamp 44, the clamp being preferably formed integral with an adjacent spring seat 26 on the equalizer 24. It will be noted that the clamp 44 is split and that a plurality of bolts 46 are employed to produce hoop tension around the bushing 42 to tightly compress the same between the clamp 44 and a reduced end section 43 of the portion 40.

Each outer extension 36 and related portion 38 present substantially vertical flat bearing surfaces 50, 50 on opposite sides thereof, said surfaces 50, 50 extending transversely of the truck.

Each brake frame is associated with a guide, and it will be noted that the guide 52 shown at the left of Figures 1 and 2 is formed integral with the frame, and the guide 54, shown at the right of Figures 1 and 2, is of a type which may be bolt-connected or weld-connected to the frame.

The guide or bracket 52 comprises spaced substantially vertical webs 56, 56 disposed at opposite sides of the associated extension 36, the webs 56, 56 extending flatwise transversely of the truck and at their outboard edges being interconnected by a substantially vertical web 58 which may be formed integral with the inboard side of the associated side rail 4. The webs 56, 56 may be lined with resilient pads 60, 60, such as rubber, on their adjacent sides, the rubber being suitably secured to flat wear plates 62. It will be noted that in the fully expanded condition of the rubber pads the wear plates 62, 62 are slightly spaced with respect to the surfaces 50, 50 on the related extension 36 of the brake frame. The walls 56, 56 are connected by suitable gussets 64, 64 to the adjacent portions of the truck frame.

The guide 54, shown at the right of Figures 1 and 2, may be a U-shaped member comprising spaced legs 66 and 68 interconnected at their upper ends by a cross piece 70. The legs 66 and 68 may present generally vertical faces on their adjacent sides to which may be adapted the rubber or resilient pads 72, 72 which may carry the friction plates 74, 74 at opposite sides of the related extension 36 generally parallel to and slightly spaced from the respective opposing surfaces 50, 50 to allow slidable contact between said surfaces. The guide 54 may be suitably secured to the adjacent transom as by welding at 75 or may be secured by a suitable bolt assembly (not shown).

It will be noted that in each arrangement the truck frame may move vertically or laterally and have certain other limited movements without disturbing the positions of the brake frames 30, 30.

Each housing 34 may contain a conventional actuating cylinder (not shown) for operating a pair of levers 76, 76 pivoted in the housing in usual manner, the levers carrying stators or shoes 78, 78 at opposite sides of the associated rotor 20 for engagement therewith as will be readily understood by those skilled in the art. The brake means in the housings 34 may be as shown in C. E. Tack Patent 2,498,625, issued on February 21, 1950.

In operation in order to stop rotation of the wheel and axle assembly 14, the brakes are actuated to apply the stators 78, 78 against opposite sides of each rotor 20. This action results in a torque force being applied to the brake structure, the torque force tending to rotate the related brake frame about its portions 48. The opposite sides of each extension 36 are thus engaged along surfaces 50, 50 with the wear plates 62, 62 and the pads 60, 60 are compressed. The resilient character of the connection between the guides and the brake frame accommodates floating movements of the truck frame on the springs without impairing the braking action. The arrangement of the guides is such that the torque forces delivered to the guides are redirected partially longitudinally of the truck and partially substantially vertically to the equalizers 24, 24.

It will be noted that the usual torque arm arrangement which extends between the brake frames and the wheel and axle assemblies is entirely eliminated and the structure is simplified to provide a rugged and economical construction.

I claim:

1. A railway car truck comprising a sprung frame member and a wheel and axle assembly with a rotatable friction element, an equalizer supported from said assembly, a brake support member resiliently connected to the equalizer and extending transversely of the frame, brake means carried by the support member for engagement with said element, and a torque connection between said members slidably operative horizontally and vertically and transversely of the frame member, said connection comprising spaced substantially vertical slightly yieldable surfaces on one member extending transversely of the frame, and substantially parallel faces on the other member received between said surfaces for engagement therewith only when torque forces are imposed on the support member.

2. A railway car truck comprising a sprung truck frame and a wheel and axle assembly with a brake rotor thereon, an equalizer supported from said assembly, a brake support member flexibly connected to the equalizer and extending transversely of the frame, brake means on said support member cooperatively associated with the rotor for braking engagement therewith, a jaw on the frame embracing said support member with operative clearance, said jaw and frame having cooperating substantially vertical faces extending transversely of the frame and engageable to resist torque forces imposed on the support member during braking application of said brake means.

3. In a railway car truck, a sprung mass, an unsprung mass including a wheel and axle assembly including a rotatable friction surface, a brake frame member constituting part of the unsprung mass and carrying brake means adapted for breaking engagement with said surface, a guide member constituting part of the sprung mass, said members being formed and arranged to slidably engage along faces extending transversely of the truck when torque forces are imposed on the brake frame member to accommodate relative movements between said masses.

4. A car truck, according to claim 3, wherein said faces on said members are aligned longitudinally of the truck, the faces on the brake frame member being normally spaced from the faces on the guide member to allow relative movement between said masses without engagement of said faces.

5. A truck, according to claim 4, wherein the faces on the guide member embrace the brake frame member and the faces on the brake frame member are disposed at opposite sides thereof adjacent the faces on the guide member, and all of said faces being substantially parallel and extending vertically and transversely of the truck.

6. A railway car truck, according to claim 4, and comprising another guide member, and said guide members being disposed adjacent opposite ends of the brake frame member.

7. A railway car truck, according to claim 4, wherein at least certain of said faces are yieldable to provide a resilient action between said members.

8. A railway car truck comprising a sprung frame and a wheel and axle assembly with a rotatable friction element, a brake support member having a main portion extending transversely of the frame at substantially the level of the axle of said assembly, an equalizer at each side of the truck supported from said assembly and supporting said frame, said member having downwardly extending end portions at opposite ends of the main portion and resiliently connected to respective equalizers below the level of said axle, brake means carried by and extending transversely from said main portion and adapted for braking engagement with said element, and jaws on the frame embracing said end portions, each jaw presenting substantially vertical faces extending transversely of the frame, and each end portion presenting a surface opposite to each face for engagement therewith to resist torque forces on said member.

9. In a truck, a sprung frame, a spaced wheel and axle assembly at each end of the frame and each assembly having a friction element rotatable therewith, said elements being in substantial alignment longitudinally of the truck, equalizers at each side of the truck extending from one assembly to the other and supported thereby, resilient means supporting the frame from the equalizers, brake support members between said assemblies and disposed one adjacent each assembly, each member having a body portion at substantially the level of the axles of said assemblies and extending transversely of the frame, braking means carried by each body portion for braking engagement with the adjacent element, each body portion having end portions extending downwardly and movably connected to said equalizers, and jaws on the frame at each end portion and embracing the end portions, said jaws being formed and arranged to accommodate substantial movement between the sprung frame and said support members in predetermined planes without binding and to movably engage each other to resist torque forces on said member due to braking action.

10. In a brake arrangement for a railway car truck comprising a sprung frame, a side rail extending longitudinally of the truck as an integral part of said frame, a wheel and axle assembly with a friction member rotatable therewith, brake beams supported from said assembly and including guide surfaces extending transversely of the truck, guide surfaces secured to said rail receiving the first-mentioned surfaces therebetween, said surfaces on said brake beams and said rail being engageable to resist braking torque.

11. In a brake arrangement for a railway car truck comprising a sprung frame, a side rail formed as part of said frame, a wheel and axle assembly resiliently supporting the frame and having a friction member rotatable therewith, brake means operatively associated with said member, engageable substantially parallel generally vertical guide surfaces on said side rail and said brake means adapted to engage only when resisting torque forces on said brake means.

12. In a brake arrangement for a railway car truck comprising a frame, a side rail extending longitudinally of the truck rigidly associated with said frame, a wheel and axle assembly at each end of the truck and having a friction surface rotatable therewith, an equalizer extending beneath the side rail and supported at opposite ends from respective wheel and axle assemblies, a spring seat on said equalizer adjacent each assembly, spring means between the seat and the frame resiliently supporting the latter, a brake frame adjacent each wheel and axle assembly extending transversely of the frame, a flexible connection between each equalizer and the adjacent end of the adjacent brake frame, brake means carried by each brake frame for cooperation with the adjacent friction surface, and a torque connection between each brake frame and said side rail comprising oppositely arranged faces on the inboard side of the side rail loosely receiving a portion of the adjacent brake frame therebetween, said faces being engageable with said portion of the brake frame to resist torque forces on said brake frame.

13. In a railway car truck comprising a movably mounted truck frame, a lower member supporting said frame and supported from a wheel and axle assembly, a brake frame supported from said lower member, and a guide member on the truck frame, said guide member and said brake frame being formed and arranged to slidably engage each other along generally vertical surfaces extending transversely of the truck to resist braking torque forces on said frame, and brake means carried by the brake frame for engagement with a friction surface on said assembly.

14. In a brake arrangement for a railway car truck comprising sprung and unsprung portions, brake means carried by the unsprung portions, normally disengaged guide surfaces on said sprung and unsprung portions, said surfaces extending transversely of the truck slidably arranged to accommodate substantial vertical movements between said sprung and unsprung portions, said surfaces being engageable when braking torque is applied to the brake means to resist the forces.

References Cited in the file of this patent

UNITED STATES PATENTS

| Number | Name | Date |
|---|---|---|
| 2,174,407 | McCune | Sept. 26, 1939 |
| 2,250,568 | Borup | July 29, 1941 |
| 2,327,151 | Cottrell | Aug. 17, 1943 |
| 2,357,619 | Tack | Sept. 5, 1944 |
| 2,365,460 | Eksergian | Dec. 19, 1944 |
| 2,423,694 | Eksergian | July 8, 1947 |